United States Patent Office 2,858,337
Patented Oct. 28, 1958

2,858,337

METHOD FOR SEPARATING A $C_{10}$ STRAIGHT CHAIN ALIPHATIC DIACID FROM MIXTURES WITH ISOMERS THEREOF

Sol A. Mednick, Baltimore, Md., Raymond Wynkoop, Metuchen, N. J., and Julian Feldman, Cincinnati, Ohio, assignors to National Distillers and Chemical Corporation, a corporation of Virginia No Drawing. Application November 3, 1955
Serial No. 544,826

12 Claims. (Cl. 260—537)

The present invention relates to an improved method for isolating and separating mixtures of acids into relatively pure fractions and, more particularly, to a novel and highly effective method for recovery of relatively pure $C_{10}$ dibasic acids from reaction products containing straight chain $C_{10}$ diacids and isomers thereof. Still more particularly, the invention relates to an improved process for treatment of a mixture comprising sebacic acid and isomers of sebacic acid to separate and recover the sebacic acid and the isomers thereof in high yield and in substantially pure form.

It has recently been found that an aliphatic conjugated diolefin can be treated with an alkali metal such as sodium or potassium, in finely dispersed form, in a selected ether medium and desirably in the presence of a small amount of a polycyclic aromatic hydrocarbon and/or solid attrition agent at a temperature preferably below about 0° C. to produce a mixture predominantly comprised of dimetallo derivatives of the dimerized diolefin. The resulting dimetallo derivatives can then be carbonated, preferably at a temperature below about 0° C., to produce the corresponding salts of dicarboxylic acids in high yields and selectivities. For example, in the case of initial reaction using sodium and butadiene, the product comprises the disodium derivatives of isomeric octadienes, and studies of the saturated diacids arising therefrom after carbonation and hydrogenation show that mixtures if isomeric $C_{10}$ dicarboxylic acids are obtained. Thus, following final hydrogenation and acidification, the product mixture yields sebacic acid, its isomers 2-ethylsuberic acid and 2,2'-didiethyladipic acid, and small amounts of other materials including monobasic carboxylic acids. In the use of other diolefins such as isoprene, dimethylbutadienes, pentadienes, and the like, for the initial reaction with the finely dispersed alkali metal, the mixture of final products will vary accordingly and ordinarily are composed predominantly of $C_{10}$ to $C_{14}$ dibasic acids.

In further illustration, and in preferred type of operation, the diolefin (e. g., butadiene) and finely dispersed alkali metal (e. g., sodium) are reacted in an attrition type apparatus such as a ball mill with a selected solid attrition agent, e. g., solid sodium chloride. The dimetallo dimers of the diolefin (e. g., disodiooctadienes) thus formed are then carbonated to the sodium salts of the corresponding acids (a. g., the sodium salts of unsaturated $C_{10}$ aliphatic dibasic acids). Organic solvents are then removed and the solids are converted to an aqueous solution which is preferably filtered prior to hydrogenation to convert the sodium salts of the unsaturated acids to the salts of the corresponding saturated acids. Preferably, the saturation of the salts is carried out by a catalytic hydrogenation.

The resulting final aqueous reaction mixture contains varying amounts of isomeric $C_{10}$ dicarboxylic acids, including the linear isomer (sebacic acid), as sodium salts. It also contains the sodium salts of the valuable branched-chain $C_{10}$ diacids as well as the salts of monobasic acids of varying molecular weight including $C_5$, $C_9$, and higher monobasic acids. There is also present relatively small amounts of impurities such as hydrogenation catalyst, condensed polymeric acids, hydrocarbon materials, unsaturated materials that may have passed through the hydrogenation step without being hydrogenated, and the like. The aqueous reaction mixture is then filtered or centrifuged to remove solids therefrom and the filtrate is acidified with a suitable acid (e. g., hydrochloric acid, sulfuric acid, etc.) and, if desired, in presence of a suitable aromatic hydrocarbon (e. g., toluene) whereby to neutralize the organic acid components in the mixture and to provide a hydrocarbon phase containing the resulting free acids in solution. Upon removal of the toluene, there is provided a crude mixture of acids comprised predominantly of sebacic acid, a mixture of isomers thereof including 2-ethylsuberic acid and 2,2'-diethyladipic acid and, normally, a relatively small amount of unsaturated components, hydrocarbon polymers, and the like. Such a crude mixture of acids in the aromatic hydrocarbon phase, or separated from the aromatic hydrocarbon phase, or such a crude mixture subjected to a preliminary treatment (e. g., distillation, extraction, etc.) to remove a light fraction of monobasic acid and hydrocarbon components, are illustrative of starting materials suitable for practice of this invention whereby to effect separation and recovery of the straight chain sebacic acid from its isomers, and separation and recovery of such isomers, in substantially high yields and in substantially pure form.

In accordance with this invention, the starting mixture comprising sebacic acid and isomers thereof, such as a mixture comprising such acids prepared by carbonation of a mixture of dialkali metal derivatives of octadienes obtained by the aforedescribed process, is subjected to a treatment with a suitable liquid aromatic solvent under conditions to selectively separate sebacic acid from the mixture, followed by a subsequent treatment of the mixture, from which sebacic acid has been removed, with a suitable liquid aliphatic hydrocarbon for selective recovery of isomers of sebacic acid present in the starting mixture. More specifically, the process embodied herein comprises subjecting the mixture of acids dissolved in a suitable liquid aromatic solvent, an example of which is toluene, to a temperature sufficiently low, such as room temperature or below, to precipitate (crystallize out) all or substantially all of the sebacic acid content of the mixture, separating the sebacic acid from the liquid aromatic solvent phase, treating the liquid aromatic solvent phase to recover substantially all of the liquid aromatic solvent thereby providing a mixture of acids comprising the isomers of sebacic acid present in the starting mixture, dissolving the mixture of acids, separated out of solution in the liquid aromatic solvent, in a suitable aliphatic hydrocarbon, an example of which is hexane, and cooling the resulting solution of acids in the aliphatic hydrocarbon to a temperature sufficiently low so as to precipitate out of solution the isomers of sebacic acid present in the starting mixture. In an embodiment, the invention is carried out by use in combination with the aliphatic hydrocarbon, for the treatment for separation of the isomers, of a relatively small amount of a liquid aromatic solvent, preferably in an amount of from about 5 to about 15% by weight of the aliphatic hydrocarbon, whereby improved results may be obtained as to purity of the recovered isomeric acids from starting mixtures containing a substantial amount of other materials such as monobasic acids, unsaturated substances, etc. Thus, by practice of the invention embodied herein, there results a selective separation of substantially pure sebacic acid and its isomers from mixtures comprising same and contaminating materials difficultly recoverable therefrom by conventional separation means, including distillation.

In order to illustrate the invention, but without intent of limitation, the following embodiments are set forth.

Example I

An acid mixture having a neutralization value of 102.1 (theoretical value for $C_{10}$ aliphatic saturated diacids = 101.12) was prepared by the aforedescribed series of reactions, starting with reaction of butadiene with finely divided sodium, whereby a toluene phase was obtained containing in solution sebacic acid, isomers of sebacic acid, and a small amount of monobasic acids, followed by removal of the toluene and distillation of the resulting acid mixture to remove a light end (monobasic acid) fraction, thereby providing the acid mixture of 102.1 neutralization value utilized for this example.

Two hundred pounds of toluene and 104.6 pounds of the acid mixture (N. E.=102.1) were charged to a kettle and heated under reflux conditions (110° C.) and maintained thereat for 20 minutes. The resulting solution was cooled to 20° C. (over a period of one hour), and held at about 20° C. for two hours. Sebacic acid precipitated out of solution and was recovered by filtration, and the filter cake washed with 60 pounds of toluene so as to insure removal from the sebacic acid of isomers thereof. The filtrate and wash toluene were returned to the kettle and the toluene removed by a distillation carried out until toluene ceased to come off at 45 p. s. i. g. steam pressure in the vessel jacket, thereby leaving about 10–15% by weight of toluene in the residue from the distillation. The residue in the kettle was then cooled to 100° C. and a mixture of 152 pounds of hexane and 23 pounds of toluene was added and which cooled the kettle contents to 60° C. The resulting solution of the residue in the kettle was then cooled to 10° C. and held at that temperature for seventeen hours during which time precipitation of isomers of sebacic acid occurred. The isomeric material was removed by filtration and washed with 76 pounds of hexane. The filtrate and wash hexane were returned to the kettle, and the hexane and toluene removed by distillation (maximum temperature of 94° C.) providing a residue consisting essentially of 2,2'-diethyladipic acid and 2-ethylsuberic acid.

The following tabulation sets forth a material balance for the foregoing example illustrating (1) that excellent recoveries of $C_{10}$ acids were obtained (43 pounds of sebacic plus 52.0 pounds of isosebacic acids out of an acid mixture charge of 104.24 pounds), and (2) the recovered acids were of excellent purity characteristics as evidenced by the neutralization value of 101.2 for the sebacic acid and a value of 101.6 for the isosebacic acid as compared to a theoretical neutralization value of 101.1 for such acids. As is also evidenced by the data in the material balance, practice of the invention also results in segregation (from the saturated $C_{10}$ diacids) of unsaturated materials that may be present in the mixture subjected to the described treatment, in view of the relatively high iodine number of 12.5 shown for the residue as compared to the relatively low iodine numbers of 0.90 and 0.82 shown for the recovered sebacic acid and isosebacic acid fractions, respectively.

ACID BALANCE

|  | Lb. | Iodine No. | N. E. | Equivalents |
|---|---|---|---|---|
| *In* | | | | |
| Total Acids | 104.6 | 2.10 | 102.1 | 1.02 |
| *Out* | | | | |
| Sebacic Acid | 43.0 | 0.90 | 101.1 | 0.425 |
| Isosebacic Acid | 52.0 | 0.82 | 101.6 | 0.510 |
| Residue | 9.24 | 12.5 | 112.1 | 0.074 |
| Total | 104.24 | | | 1.009 |
| Accountability, percent | 99.6 | | | 99 |

TOLUENE BALANCE

| In | Lb. | Out | Lb. |
|---|---|---|---|
| Charge | 200.0 | Distilled off | 227.5 |
| Wash | 60.0 | In Sebacic Cake | 14.5 |
| In Hexane | 23.0 | In Hexane Distillation | 26.0 |
| | | In Residue | 10.76 |
| | 293.0 | | 278.76 |

Accountability=98%.

HEXANE BALANCE

| In | Lb. | Out | Lb. |
|---|---|---|---|
| Charge | 152 | Distilled off | 173.0 |
| Wash | 75 | In Isosebacic Acid Cake | 20.0 |
| | 229 | | 193.0 |

Accountability=84.5%.

Example II

A mixture of acids, prepared in the manner described in Example I, and having a neutralization equivalent of 104.2 and an iodine number of 2.3 was mixed with 2 parts by weight of toluene, heated under reflux conditions (110° C.) for 20 minutes, cooled to 20° C. over a period of about one hour, and held at that temperature for about two hours. Precipitation of sebacic acid occurred to the extent of 34% by weight of the starting acid mixture. The sebacic acid, obtained by filtration, had a neutralization equivalent of 101.8, an iodine value of 0, and a melting point of 133–134.5° C.

The filtrate was distilled to remove the toluene, and the residue cooled to 100° C. Hexane was then added to the residue in an amount of 2 parts by weight to one part of residue, and the resulting solution was then cooled to 10° C. and held at that temperature for seventeen hours. Precipitation of a mixture of the isomers of sebacic acid occurred to the extent of 59.8% by weight, based on the acid mixture subjected to the described treatment, and the mixture of isomeric acids thus recovered by filtration had a neutralization equivalent of 102.3, an iodine number of 1.1, and a melting point of 60–62° C.

In carrying out the selective separation process as embodied herein, the initial treatment for selective removal of sebacic acid from the mixture comprising sebacic acid and isomers thereof is carried out by initial dissolution of the mixture in a suitable solvent consisting essentially of a liquid aromatic solvent. For such a purpose, liquid aromatic hydrocarbons such as toluene are particularly suitable but other liquid aromatic solvents are contemplated for such use, including benzene, alkylbenzenes, xylene, ethylbenzenes, anisole, diphenyloxide, phenol, and the like. In particular, the aromatic solvent employed should preferably have a boiling point in the range of from about 80 to about 260° C. as is provided by materials such as benzene and diphenylether. As to the subsequent step for recovery of the isomers of sebacic acid, liquid aliphatic hydrocarbon materials such as hexane are particularly suitable but, if desired, other aliphatic hydrocarbon materials such as saturated aliphatic hydrocarbons of up to about twelve carbon atoms may be used. Moreover, hydrocarbons such as liquefied propane are contemplated for such usage in carrying out the separation process under pressure. As to the latter step for selective recovery of the isomeric acid components and their separation from monobasic acids and other undesired components that may be present in the starting mixture, the solvent used may consist of the liquid aliphatic hydrocarbon but, in certain instances and as aforesaid, it may be desirable to use therewith a relatively small amount of a liquid aromatic solvent, such as those aforedefined, as use of a small amount of aromatic solvent generally provides the isomeric acids of improved purity, particularly when the acid mixture subjected to the described process for separation and recovery of sebacic acid and its isomers contains relatively high amounts of monobasic acid components for mixtures of the type contemplated for treatment herein. In the use of an aromatic solvent in relatively small amount with the aliphatic hydrocarbon in the step for selective recovery of the isomeric acid components, the amount used should not be such that their recovery is substantially effected and, for such a purpose, the amount of aromatic material is generally maintained to a concentration of about 5 to about 20% by weight of the mixture with the aliphatic hydrocarbon.

As is apparent from the foregoing description of the invention and the results obtained by practice thereof, a highly selective separation is effected in that, by the initial treatment of the starting mixture with a suitable aromatic solvent, substantially all of the components of the mixture except for sebacic acid are rejected into the aromatic solvent phase, and by the subsequent treatment involving the aliphatic hydrocarbon, substantially all of the components of the mixture, from which sebacic acid has been removed, except for the isomers of sebacic acid, are removed from mixture with the isomers. As is further apparent from the data and particularly from the iodine values and neutralization equivalent (112.1) shown in the material balance for the residue obtained from the described embodiment, a particular feature of the process embodied herein is that it effectively removes from the starting mixture unsaturated materials of the diacid type otherwise similar to the desired $C_{10}$ diacids and which unsaturated materials are difficult to separate therefrom by conventional separation methods. Since such unsaturated materials are potentially valuable for conversion to desired products, such as to the corresponding saturated diacids, their separation by a process as embodied herein is particularly advantageous as such unsaturated components may be recycled to the hydrogenation step in a process as aforedescribed for preparation of starting mixtures suitable for practice of this invention.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A method for separation and recovery of dicarboxylic acid components of mixtures comprising a straight chain $C_{10}$ aliphatic dicarboxylic acid and isomers of said acid which comprises reducing the temperature of said mixture dissolved in a liquid aromatic solvent for said acid mixture to precipitate out of said solution substantially all of the straight chain aliphatic dicarboxylic acid, said liquid aromatic solvent being characterized by having a boiling point of about 80 to about 260° C., separating the precipitated straight chain dicarboxylic acid from the liquid aromatic solvent phase, removing substantially all of the liquid aromatic solvent from said liquid aromatic solvent phase thereby providing a mixture comprising the isomers of said straight chain acid, dissolving the mixture of said isomers in a liquid aliphatic hydrocarbon, and reducing the temperature of the resulting solution to precipitate out of solution the isomers of said straight chain dicarboxylic acid.

2. A process, as defined in claim 1, wherein the mixture of isomers from which the straight chain acid has been removed is dissolved in a solution comprising a liquid aliphatic hydrocarbon and a liquid aromatic hydrocarbon that has a boiling point of about 80 to about 260° C., said solution containing said aromatic hydrocarbon in an amount of from about 5 to about 20% based on the weight of the aliphatic hydrocarbon.

3. A method for separation and recovery of dicarboxylic acid components of a mixture comprising a $C_{10}$ straight chain aliphatic dicarboxylic acid and isomers thereof, said mixture having been prepared by carbonation of a mixture of dialkali metal derivatives of dimers of butadiene and conversion of said derivatives to their corresponding $C_{10}$ dicarboxylic acids, which comprises reducing the temperature of said mixture of dicarboxylic acids dissolved in a liquid aromatic hydrocarbon that has a boiling point of about 80 to about 260° C. to precipitate out of solution substantially all of the $C_{10}$ straight chain aliphatic dicarboxylic acid in substantially pure form, separating the precipitated $C_{10}$ straight chain aliphatic dicarboxylic acid from the liquid aromatic hydrocarbon phase, removing substantially all of the liquid aromatic hydrocarbon from said liquid aromatic hydrocarbon phase to provide a mixture comprising the isomers of said straight chain acid, dissolving the mixture of said isomers in a liquid aliphatic hydrocarbon, reducing the temperature of the resulting solution of isomers to precipitate out of solution the isomers of said straight chain dicarboxylic acid, and separating said precipitated isomers from the aliphatic hydrocarbon phase.

4. A method for separation and recovery of $C_{10}$ dicarboxylic aliphatic acid components from a mixture comprising sebacic acid and a plurality of isomers thereof, said mixture having been prepared by carbonation of an isomeric mixture of dialkali metal octadienes and conversion of said dialkali metal octadienes to their corresponding $C_{10}$ saturated aliphatic dicarboxylic acids, which comprises subjecting said mixture of $C_{10}$ dicarboxylic aliphatic acids dissolved in a liquid aromatic hydrocarbon, said aromatic hydrocarbon having a boiling point of from about 80 to about 260° C., to a temperature not exceeding about 20° C. to precipitate out of solution sebacic acid substantially free of isomers thereof, separating the precipitated sebacic acid from the aromatic hydrocarbon phase, removing substantially all of the liquid aromatic hydrocarbon from said aromatic hydrocarbon phase, whereby to provide a mixture comprising the isomers of sebacic acid, dissolving the mixture of isomers in a liquid aliphatic hydrocarbon, subjecting the resulting solution of isomers to a temperature not exceeding about 10° C. to precipitate out of solution the isomers of sebacic acid, and separating said precipitated isomers from the aliphatic hydrocarbon phase.

5. A process, as defined in claim 4, wherein the mixture of $C_{10}$ dicarboxylic aliphatic acids is prepared by carbonation of a mixture of disodiooctadienes and conversion of said disodiooctadienes to their corresponding $C_{10}$ saturated aliphatic dicarboxylic acids.

6. A process, as defined in claim 4, wherein the liquid aromatic hydrocarbon is toluene.

7. A process, as defined in claim 4, wherein the aliphatic hydrocarbon is a saturated aliphatic hydrocarbon.

8. A process, as defined in claim 4, wherein the aliphatic hydrocarbon is a saturated aliphatic hydrocarbon containing up to about twelve carbon atoms.

9. A process, as defined in claim 4, wherein the aliphatic hydrocarbon is hexane.

10. A method for separation and recovery of $C_{10}$ dicarboxylic aliphatic acid components from a mixture comprising sebacic acid and isomers thereof including 2,2'-diethyladipic acid and 2-ethylsuberic acid, said mixture having been prepared by carbonation of a mixture of disodiooctadienes and conversion of said disodiooctadienes to their corresponding $C_{10}$ saturated aliphatic dicarboxylic acids, which comprises reducing the temperature of said mixture of dicarboxylic acids dissolved in toluene to precipitate out of solution in substantially pure form substantially all of the sebacic acid in said mixture, separating the precipitated sebacic acid from the toluene phase, removing from the toluene phase an amount of toluene sufficient to provide a residue comprising the isomers of sebacic acid and a small amount of toluene based on the weight of said residue, dissolving the residue in hexane, and reducing the temperature of the resulting hexane solution to precipitate out of solution the isomers of sebacic acid in substantially pure form.

11. A method, as defined in claim 10, wherein the mixture of dicarboxylic acids is subjected to a distillation pretreatment for substantial removal therefrom of low boiling monobasic acids and hydrocarbon components that may be present in said mixture.

12. A process, as defined in claim 10, wherein the toluene solution is reduced in temperature to about 20° C. to precipitate out the sebacic acid, and the hexane solution of the isomers is reduced in temperature to about 10° C. to precipitate out the isomers of sebacic acid.

References Cited in the file of this patent

UNITED STATES PATENTS

| | | |
|---|---|---|
| 2,352,461 | Walker | June 27, 1944 |
| 2,716,133 | Pooler | Aug. 23, 1955 |
| 2,716,662 | Cohen et al. | Aug. 30, 1955 |
| 2,749,364 | Greenberg | June 5, 1956 |

FOREIGN PATENTS

| | | |
|---|---|---|
| 1,093,096 | France | Nov. 17, 1954 |